United States Patent
Barberá Mayor (10) Patent No.: US 12,139,380 B2
(45) Date of Patent: Nov. 12, 2024

(54) GANTRY CRANE FOR CONTAINERS AND OPERATING METHOD

(71) Applicant: Juan Carlos Barberá Mayor, San Vicente del Raspeig (ES)

(72) Inventor: Juan Carlos Barberá Mayor, San Vicente del Raspeig (ES)

(*) Notice: Subject to any disclaimer, the term of this patent is extended or adjusted under 35 U.S.C. 154(b) by 251 days.

(21) Appl. No.: 17/995,208

(22) PCT Filed: Mar. 30, 2021

(86) PCT No.: PCT/ES2021/070217
§ 371 (c)(1),
(2) Date: Sep. 30, 2022

(87) PCT Pub. No.: WO2021/198546
PCT Pub. Date: Oct. 7, 2021

(65) Prior Publication Data
US 2023/0174350 A1 Jun. 8, 2023

(30) Foreign Application Priority Data
Apr. 1, 2020 (ES) .................... 202030266

(51) Int. Cl.
*B66C 19/00* (2006.01)
*B65G 63/00* (2006.01)
*B66C 13/46* (2006.01)

(52) U.S. Cl.
CPC .......... *B66C 19/002* (2013.01); *B65G 63/004* (2013.01); *B66C 13/46* (2013.01); *B66C 2700/01* (2013.01)

(58) Field of Classification Search
CPC .................... B66C 19/002; B65G 63/004
See application file for complete search history.

(56) References Cited

U.S. PATENT DOCUMENTS

| | | | |
|---|---|---|---|
| 3,630,390 A * | 12/1971 | Tax | ........ B66C 19/002 212/316 |
| 4,018,349 A | 4/1977 | Hupkes | |
| 5,775,866 A | 7/1998 | Tax et al. | |
| 5,931,625 A | 8/1999 | Tax et al. | |

(Continued)

FOREIGN PATENT DOCUMENTS

| | | | |
|---|---|---|---|
| CN | 105836630 A | 8/2016 | |
| EP | 2586735 B1 * | 6/2014 | ....... B65G 63/004 |

(Continued)

*Primary Examiner* — Michael R Mansen
*Assistant Examiner* — Juan J Campos, Jr.
(74) *Attorney, Agent, or Firm* — Ice Miller LLP; Safet Metjahic (57) ABSTRACT

A gantry crane for containers with at least one raised horizontal beam, comprising ship-side spreaders supported on a first section of said horizontal beam, container land-side spreaders supported on a second section of said horizontal beam, and a horizontal transport carriage, mounted displaceably along the beam so that it is susceptible to being placed under the containers lifted by the ship-side spreaders, and arranged to support the containers and displace them to a position below the land-side spreaders, said horizontal transport carriage comprising anchoring means for separably anchoring the containers.

16 Claims, 7 Drawing Sheets

(56) References Cited

U.S. PATENT DOCUMENTS

| | | | | |
|---|---|---|---|---|
| 7,523,836 B2 * | 4/2009 | Larsen | ............... | B66C 19/002 |
| | | | | 212/312 |
| 2002/0102150 A1 * | 8/2002 | Dunstan | ............... | B65G 1/02 |
| | | | | 414/267 |
| 2003/0077149 A1 | 4/2003 | Dobner et al. | | |
| 2006/0182524 A1 | 8/2006 | Franzen et al. | | |
| 2007/0128005 A1 | 6/2007 | Di Rosa | | |

FOREIGN PATENT DOCUMENTS

| | | | | |
|---|---|---|---|---|
| JP | 2012121719 A | 6/2012 | | |
| KR | 20130072571 A | 7/2013 | | |
| WO | WO-2013066163 A1 * | 5/2013 | ........... | B65G 63/004 |
| WO | 2013145213 A1 | 10/2013 | | |

* cited by examiner

GANTRY CRANE FOR CONTAINERS AND OPERATING METHOD

CROSS-REFERENCE TO RELATED PATENT APPLICATIONS

This is a U.S. National Phase Application under 35 U.S.C. § 371 of International Patent Application No. PCT/ES2021/070217, filed Mar. 30, 2021, and claims priority to Spanish Patent Application No. P202030266, filed Apr. 1, 2020, which is incorporated by reference in its entirety. The International Application was published on Oct. 7, 2021, as International Publication No. WO 2021/198546 A1.

The present invention relates to a gantry crane for loading and unloading shipping containers, such as in ports and railway stations. It also relates to a method of operating said gantry crane.

BACKGROUND OF THE INVENTION

Container gantry cranes, also called STS (Ship to Shore) cranes, are known in the prior art. They consist of infrastructures for loading and unloading containers at transport terminals and usually comprise:
- a gantry-shaped structure, usually with four columns and a cantilevered horizontal beam at the ends thereof,
- a system of rails in the beam, and
- a spreader.

Spreaders are devices by way of a grip frame, which usually hang from a carriage that can be moved by the beam rails, and whose height is controlled by cables with pulleys, driven by a motor. The spreader is attachable to the four upper corners of the containers by anchoring means, which are usually electro-mechanical elements known as twistlocks. They can also have centering means, such as the fins known as flippers, actuated by the crane operator and which allow the spreader to be centred when placed on the container.

The gantry cranes carry out the transfer of the containers between, for example, the dock and the container vessel. By law, cranes must be handled manually by at least one operator. The operator who manages the crane is usually located in a cabin arranged at the top of the gantry; when the gantry is at the height of the ship, the operator performs a maneuver so that the crane with the spreader moves and descends to the container to be loaded or unloaded, actuates the twistlocks to lock them to the container, hoists it, moves it horizontally and deposits it in the dock. When already on the ground, containers are placed on another means of transport (usually a container truck) or stacked.

It should be noted that in the most modern "semi-automatic" cranes the cabin is virtualized in an attached control building and the operator manages loading and unloading remotely.

Gantry cranes are structures that can measure up to 140 meters in height and load more than 20,000 tons. It is obvious that the loading and unloading times of a given container are long, and the amount of energy to operate a gantry crane is high.

To reduce energy consumption and loading and unloading times, the gantry cranes disclosed in documents U.S. Pat. Nos. 3,630,390 and 5,931,625 have a beam with spreaders on the side of the ship (ship-side spreaders, hereinafter), spreaders on the land-side (land-side spreaders, hereinafter), and horizontal transport carriages, which offer the possibility of moving a container from the ship-side to the land-side while the ship-side spreader descends to take another container and the land-side spreader ascends to unload the container from the carriage, and then make the runs in reverse.

In turn, document U.S. Pat. No. 3,630,390 shows a crane bridge that extends between two banks of a canal, capable of unloading or loading a container ship that is in the canal. The crane bridge has two groups of spreaders and a trolley for each group, which can work at the same time.

For its part, the crane of document U.S. Pat. No. 5,931,625A discloses a trolley with a platform for two containers and with a rotation system to exchange the position of the containers, thanks to which the crane allows unloading a container from the ship in a direction of operation of the spreaders and loading another container on the ship in the opposite direction, but always in parallel to the port line.

However, it is appropriate to provide improvements to existing cranes to further facilitate the handling of containers and reduce loading and unloading time.

DESCRIPTION OF THE INVENTION

The aim of the present invention is to provide a gantry crane presenting the advantages described below.

The present invention consists of a gantry crane for containers with at least one horizontal beam with rails, arranged elevated, and comprising:
- one or more ship-side spreaders arranged to lift one or more containers, supported on a first section of said horizontal beam,
- one or more land-side spreaders arranged to lower one or more containers, supported on a second section of said horizontal beam, and
- a horizontal container transport carriage, such as for example those known as trolleys, mounted displaceably along the beam so that it can be placed under the containers lifted by the ship-side spreaders, to support them and to move them until they are placed under the land-side spreaders, said horizontal transport carriage comprising one or more anchoring assemblies for anchoring the containers in a dissociable way As mentioned in the previous section, spreaders are devices that act as a gripping frame, and whose height is controlled by a cable pulley system driven by a motor. The spreaders can be anchored in a dissociable way to the four upper corners of the containers by anchoring means, which are usually electro-mechanical elements known as twistlocks.

Thanks to the present crane configuration, it is possible to lift containers in one section of the beam while simultaneously lowering other containers in another section, preferably at opposite sections of the beam. This technical effect has the advantage of a more time-efficient use the crane by the operators, lifting some spreaders while lowering others while moving the horizontal transport carriage from one side to the other.

Preferably, the crane comprises at least one support carriage, arranged to travel along the first section of the horizontal beam and to support at least one of the ship-side spreaders. Likewise, the crane may comprise a support carriage arranged to travel along the second section of the horizontal beam and to support at least one of the land-side spreaders. In this way, it is possible to load and/or unload containers in different lateral positions.

In a preferred embodiment, the horizontal beam comprises two sets of rails, while the support carriages of the spreaders comprise a set of wheels arranged to move in one of said two sets of rails, while the horizontal transport carriage comprises another set of wheels arranged to move in the other one of said two sets of rails. Preferably, the horizontal beam has a double configuration and one of said two sets of rails is located on the inner faces of the horizontal beam, wherein the set of wheels of the support carriages is arranged to move on said one of the two sets of rails, while the other one of said two sets of rails is located on the upper surface of the horizontal beam and the set of wheels of the horizontal transport carriage is arranged to move on said other one of the two sets of rails.

Another differential aspect of the present crane is that it comprises actuating means arranged to simultaneously actuate the vertical displacement of at least one ship-side spreader and a land-side spreader, said spreaders being operatively linked to each other so that the potential gravitational energy and/or kinetic energy available in the containers lowered with the land-side spreaders can be exploited by the actuating means to lift other containers with the ship-side spreaders. The advantages obtained thanks to this feature consist of:

the use of the potential gravitational and/or kinetic energy of the containers that are lowered to lift the containers that are hoisted, by using such energy, it is feasible to have more than one ship-side spreader and more than one land-side spreader working in parallel, together with a carriage capable of horizontally moving one or more containers, without the need to excessively increase the power required by the crane, which further multiplies the use of loading and unloading time, by using such energy, it is possible to increase the loading speed of the containers without excessively increasing the energy consumed by the crane, which further multiplies the use of loading and unloading time.

In a first embodiment dependent on the foregoing, said actuating means comprise a cable system with at least one cable that operatively links said spreaders to each other, said cable system being susceptible to be actuated by a transmission system. In relation to the transmission system, it may comprise, for example, a gear system, a winch and/or an equivalent system operable by a motor. In a second embodiment, said actuating means comprise an independent cable system for each spreader, wherein a transmission system is arranged to connect to said cable systems in a dissociable way and operatively link them at will. In this latter embodiment, the actuating means can be actuated by a single motor or by independent motors for each spreader.

In turn, optionally, the gantry crane can comprise a regenerative brake in the spreaders and/or in the horizontal transport carriages, so that the kinetic energy available when moving the containers can be recovered by said regenerative brake.

In an optional embodiment of the present gantry crane, it comprises one or more parallel beams under said horizontal beam, at different working heights, with their corresponding horizontal transport carriages. In this way, the alternative use of several ship-side spreaders and descent at the same time is favored.

As mentioned above, the horizontal transport carriage comprises one or more anchoring assemblies to the containers, which preferably consist of twistlocks, as well as those of the present spreaders.

Preferably, for greater automation of the crane, the ship-side spreaders, the land-side spreaders and/or the horizontal transport carriage comprise speed sensors, position sensors with respect to the containers and/or coupling sensors of the anchoring means and anchoring assemblies.

A complementary aspect of this gantry crane consists of the arrangement of one or more additional horizontal beams in a series configuration to said horizontal beam, which comprise their respective horizontal transport carriages or their respective spreaders, with anchoring means and anchoring assemblies for anchoring to containers either above or under them, to receive them and move them through said additional horizontal beams.

To facilitate the operation of the present gantry crane, said horizontal transport carriage may have a platform for access by an operator, for example, for the control of the anchoring of the containers to the horizontal transport carriage and/or to the land-side spreaders.

In a preferred embodiment, each anchoring assembly of the horizontal transport carriage comprises a rotation mechanism suitable for rotating the anchoring assembly 90° about its axis of vertical symmetry. As an option, the rotation mechanism consists of a rotating crown (disc-shaped mechanism, widely used to support and rotate the booms of tower cranes of building constructions). The turning crown would be positioned on the vertical symmetry axis of the anchoring assembly, so that its center would be the pivot point. Each rotation mechanism comprises a control system configured to rotate 90° its respective anchoring assembly during the horizontal translation of the carriage, so that each container arrives rotated 90° from one end to the other of the beam. The container goes from being on the ship-side in a position parallel to the port line (which is the position in which it arrives on the ship) to being on the land-side in a position perpendicular to the port line, which is a more suitable position for loading by land vehicles. In a possible subembodiment, the land-side spreaders are positioned perpendicular to the beam. In another possible subembodiment, the land-side spreaders have rotation means, so that they can anchor the containers both in a parallel position and in a position perpendicular to the beam, and thus can unload the containers on the ground in any of the positions. There are several advantages implemented in this preferred embodiment.

Another aspect of the present invention consists of a method of unloading containers by means of a gantry crane as described above. This method is characterized by comprising a first step including simultaneously lifting one or more ship-side spreaders and lowering one or more land-side spreaders. The simultaneous execution of the steps mentioned in this step is what allows to obtain the benefits and advantages described by the present gantry crane.

For greater time efficiency, said step preferably includes simultaneously moving at least one horizontal transport carriage closer to the ship-side spreaders. This step is considered as optional due to the fact that, in certain situations, the horizontal transport carriage may already be adjacent to the ship-side spreaders, for example at the beginning of the unloading of a cargo.

Following any of the previous steps, preferably the method of operation comprises placing at least one horizontal transport carriage under the containers already hoisted by the ship-side spreaders, anchoring the horizontal transport carriage to said containers and undocking the ship-side spreaders from them, while at the same time undocking the land-side spreaders from the containers lowered therewith. As is usual in container unloading, there are operators who control the anchoring of the spreaders to the containers both in the loading area and in the unloading area. Thanks to this step, the time spent by these operators during the unloading of a shipment with several containers is optimized.

Subsequent to the preceding step, the method may comprise a step including simultaneously lifting one or more land-side spreaders, lowering one or more ship-side spreaders, and moving the loaded horizontal transport carriage closer to the land-side spreaders.

Following the preceding step, the method may comprise a step of positioning the containers displaced by the horizontal transport carriages under the land-side spreaders, anchoring the land-side spreaders to said containers, and undocking the horizontal transport carriages of said containers, while anchoring the ship-side spreaders to new containers.

After more than half a century since the development of the first gantry crane and after major innovations applied to the sector, no crane has yet been made public that includes the aforementioned characteristics, works according to the method described here, or provides the valuable advantages mentioned.

BRIEF DESCRIPTION OF THE DRAWINGS

For a better understanding of the description made herein, a set of drawings has been provided wherein, schematically and solely by way of a non-limiting example, a practical case of an embodiment of the gantry crane for containers of the present invention is represented.

DESCRIPTION OF A PREFERRED EMBODIMENT

An embodiment of the container gantry crane and the method of operation claimed is described below, with reference to FIGS. 1 to 4.

Figure 1:
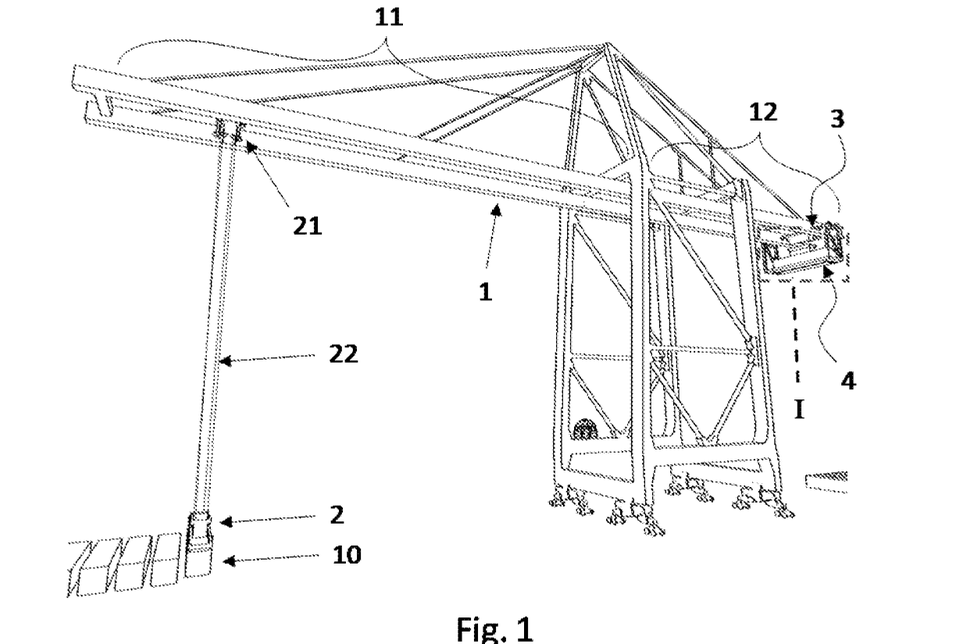
FIG. 1 is a perspective view of a first example of embodiment of the gantry crane for containers.

A preferred embodiment of the gantry crane of the present invention is shown in FIG. 1, wherein the following can be seen:
- a horizontal beam (1),
- a ship-side spreader (2), supported on a first section (11) of said horizontal beam (1) by means of a support carriage (21), said spreader (2) being lowered by means of a cable system with pulleys (22) and anchored to a container (10),
- a land-side spreader (3), supported on a second section (12) of said horizontal beam (1), and
- a horizontal transport carriage (4), supported on said horizontal beam (1) between the ship-side spreader (2) and the land-side spreader (3).

For reasons of clarity, FIG. 1 does not show the rails or the operator's cab of the gantry crane.

Figure 2:
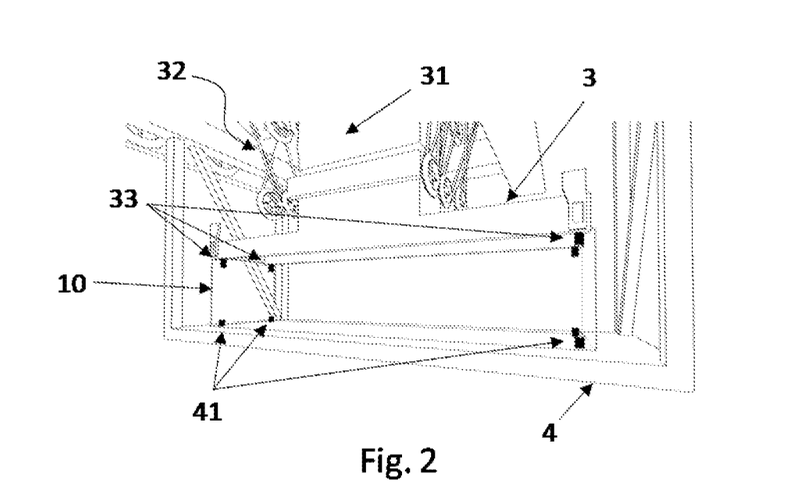
FIG. 2 is an enlarged view of inset I of FIG. 1.

FIG. 2 shows an enlarged view of inset I in FIG. 1. It shows in detail the land-side spreader (3), the corresponding support carriage (31), the corresponding cable system (32) and the corresponding anchoring means (33) to the container (10), as well as the horizontal transport carriage (4), which comprises an anchoring assembly (41). For sake of clarity, the container (10) of FIG. 2 has been depicted with transparent walls.

Figure 3:
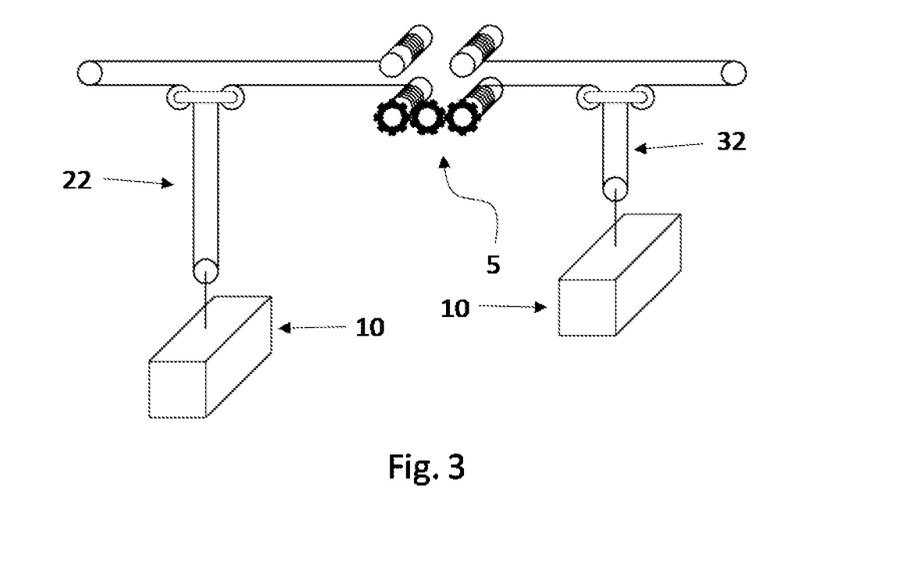
FIG. 3 is a schematic view of a gantry crane for containers with a transmission system that links the simultaneous rise and fall of the spreaders.

FIG. 3 shows a schematic embodiment of the present crane where the cable systems (22, 32) that maneuver the ship-side spreaders (2) and the descent land-side spreaders (3) are linked by a winch (5), so that the gravitational potential energy and the kinetic energy available when lowering the containers (10) with the land-side spreaders (3) is used for the lifting of the containers (10) by the ship-side spreaders (2).

Figure 4:
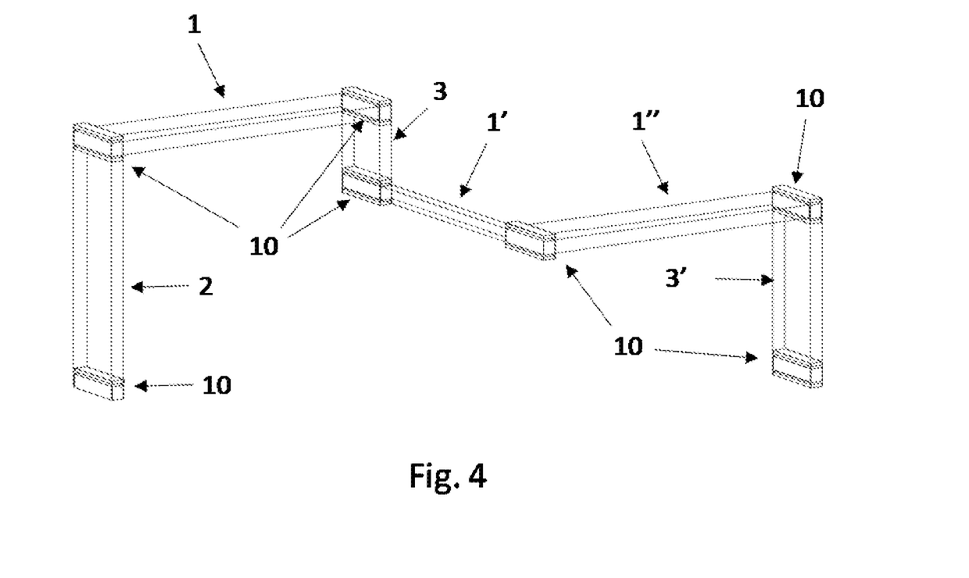
FIG. 4 is a schematic view of an example of embodiment of a gantry crane for containers with additional beams in series with the horizontal beam.

FIG. 4 schematically depicts a gantry crane that has two additional horizontal beams (1', 1") in a configuration in series with said horizontal beam (1), which comprise their respective horizontal transport carriages (not shown in the figure) and their respective spreaders (3'), with means for anchoring to containers (10), either above or under them, to receive them and move them through said additional horizontal beams (1', 1").

Figure 5:
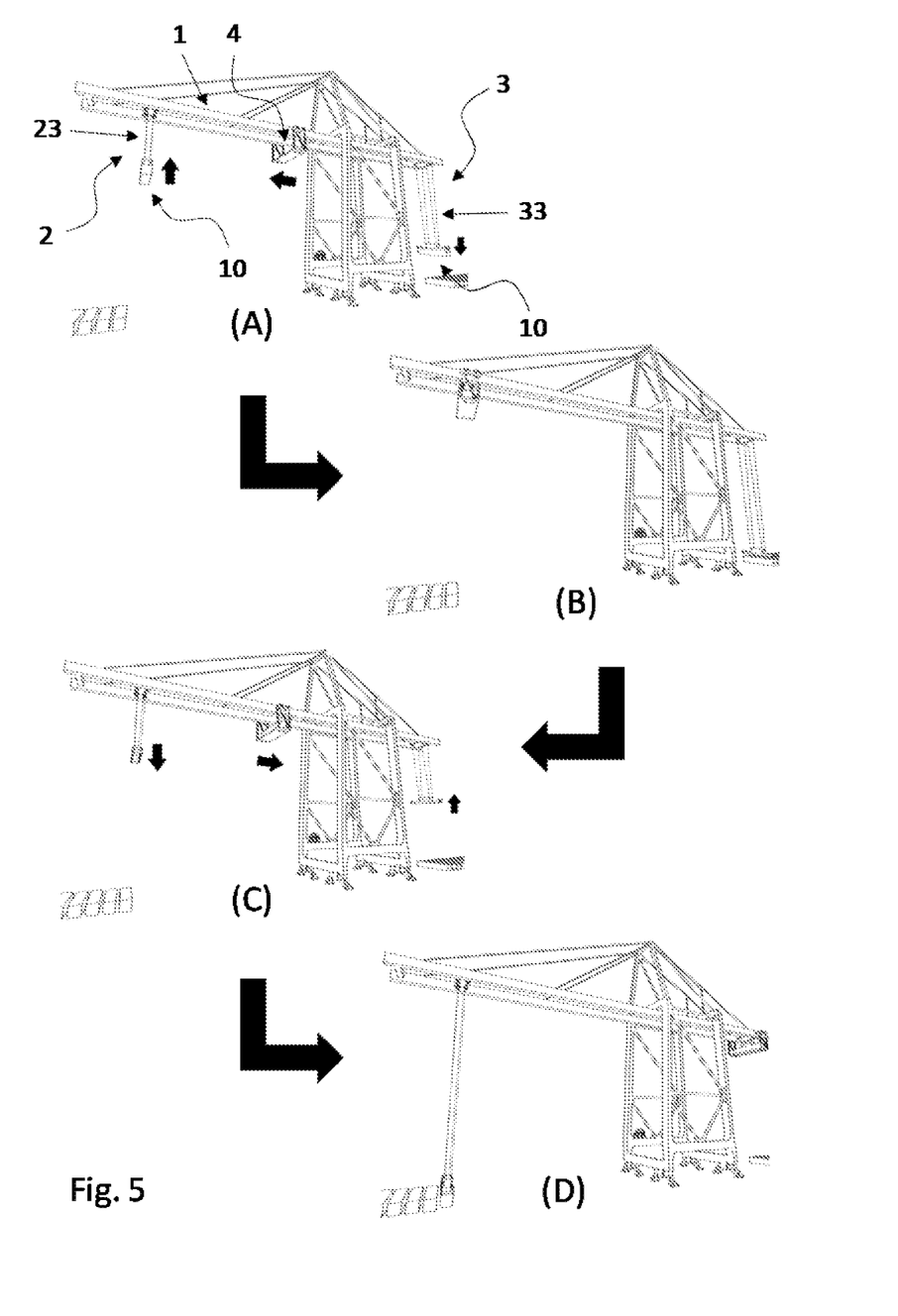
FIG. 5 is a representation of a possible succession of steps of a first method of operation of the present invention.

As regards the method of operation, exemplary steps of unloading a container with the crane depicted in FIG. 1 have been depicted in FIG. 5. In this example, the method comprises a first step (A) including simultaneously lifting the ship-side spreader (2) with a container (10) and lowering the land-side spreader (3) with another container (10), while moving the horizontal transport carriage (4) closer to the ship-side spreader (2).

Next, the method of operation shown comprises a second step (B) which includes placing the horizontal transport carriage (4) under the container (10) already hoisted by the ship-side spreader (2), anchoring the horizontal transport carriage (4) to said container (10) and undocking the ship-side spreader (2), while at the same time undocking the land-side spreader (3) from the lowered container.

Subsequently, the method of FIG. 5 shows a third step (C) comprising simultaneously lowering the ship-side spreader (2), lifting the land-side spreader (3) and moving the horizontal transport carriage (4) loaded with a container (10) closer to the land-side spreader (3).

To complete the cycle, the method shown in FIG. 5 comprises a fourth step (D) comprising placing the container (10) displaced by the horizontal transport carriage (4) under the land-side spreader (3), anchoring the land-side spreader (3) to said container, and undocking the horizontal transport carriage (4), while anchoring the ship-side spreader (2) to a new container.

Figure 6:
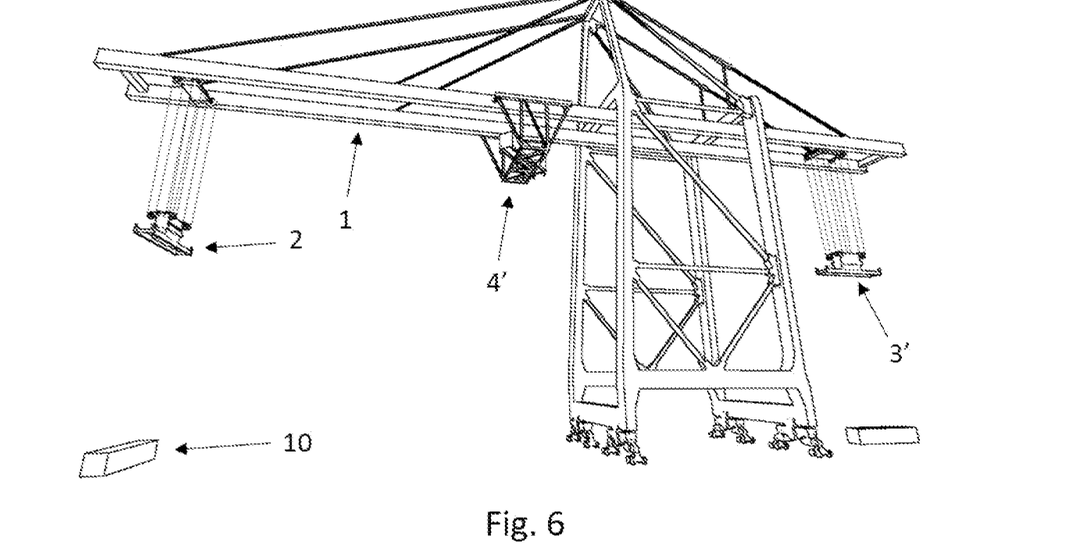
FIG. 6 is a perspective view of a second example of embodiment of the gantry crane for containers.

FIG. 6 shows a second preferred embodiment of the gantry crane of the present invention, where the following can be seen:
- a horizontal beam (1),
- a ship-side spreader (2), whose anchoring position of the containers (10) is the usual one, i.e. perpendicular to the horizontal beam (1),
- a land-side spreader (3'), whose anchoring position of the containers (10) is instead parallel to the horizontal beam (1), and
- a horizontal transport carriage (4'), whose anchoring assembly (41') supports a container (10) in the process of rotation by means of the rotation mechanism (42').

Figure 7:
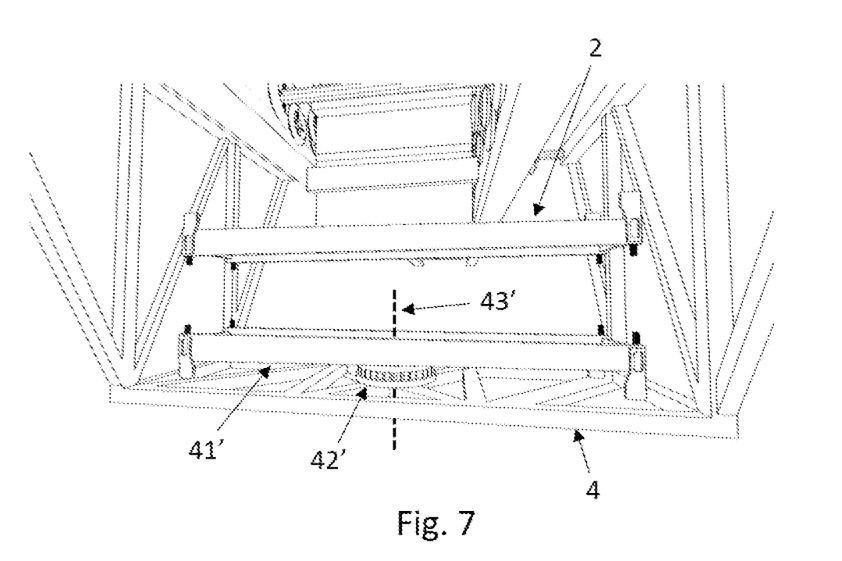
FIG. 7 is an enlarged view of inset VI of FIG. 6.

FIG. 7 illustrates in detail the horizontal transport carriage (4') under the ship-side spreader (2), where the anchoring assembly (41') is supported by the rotation mechanism (42') for its rotation about its vertical axis (43') of symmetry.

Figure 8:
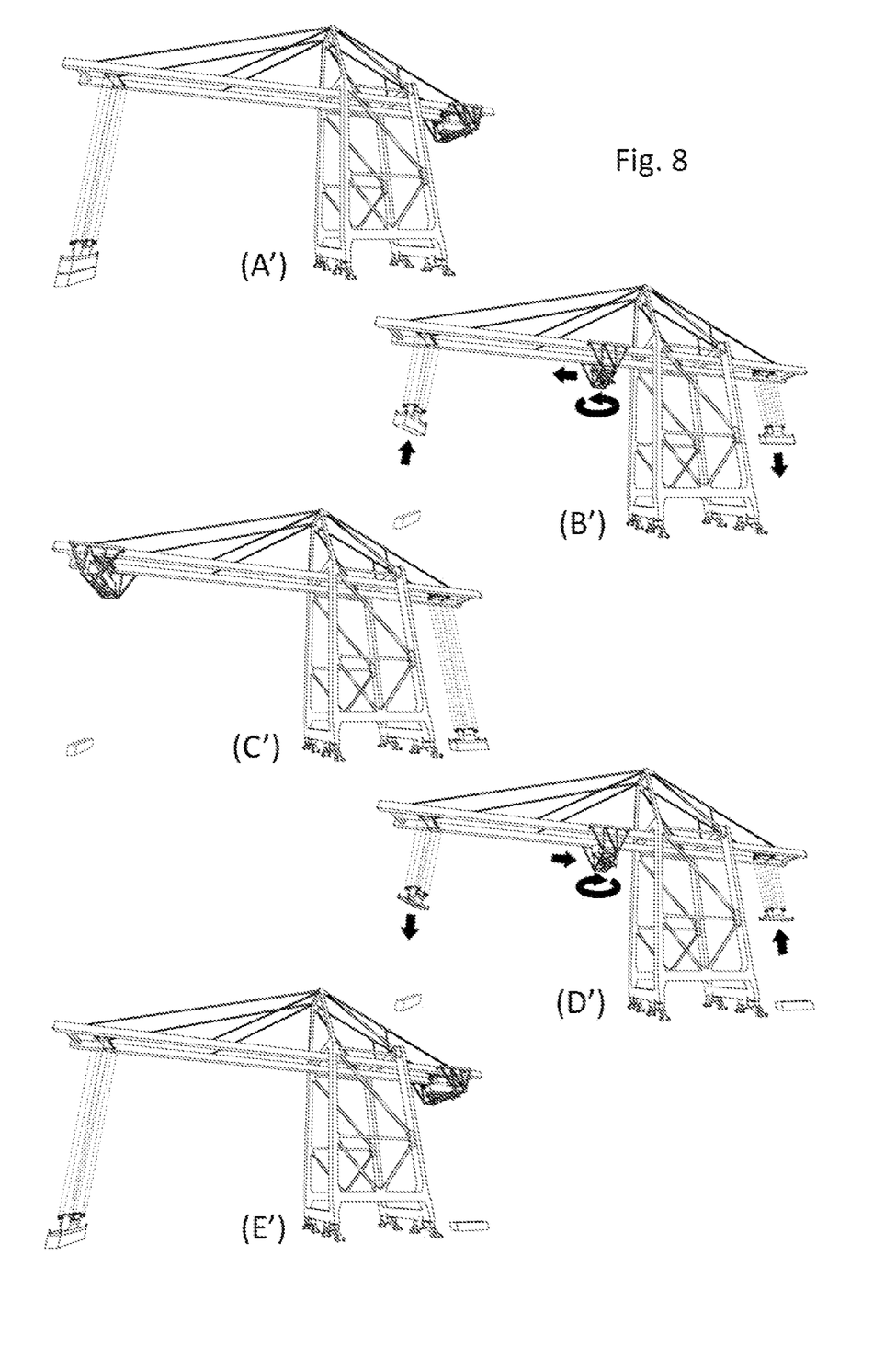
FIG. 8 is a representation of a possible succession of steps of a second method of operation of the present invention.

FIG. 8 shows an example of the method for unloading containers stored on a ship (not shown for clarity) by means of the crane shown in FIGS. 6 and 7. In this example, the method comprises a first step (A') that includes simultaneously anchoring the ship-side spreader (2) to one of the containers (10) of the ship, undocking the container already carried by the horizontal transport carriage (4') with respect to the anchoring assembly (41') thereof, and anchoring the land-side spreader (3') to the said latter container (10).

Next, the method of operation of FIG. 8 comprises a second step (B') which includes simultaneously lifting the container (10) of the ship with the ship-side spreader (2) while the horizontal transport carriage (4') is being moved closer to it until it is placed under said container (10), while the other container (10) is being lowered with the land-side spreader (3').

As can be seen, the position of the container 10 on the ship-side is perpendicular to the horizontal beam 1, while the position of the container 10 on the land-side is parallel to the horizontal beam 1.

Next, the method of operation of FIG. 8 comprises a third step (C') which includes simultaneously anchoring the horizontal transport carriage (4') to said container (10) of the ship and undocking the ship-side spreader (2), while at the same time undocking the land-side spreader (3') from the lowered container.

Subsequently, the method of FIG. 8 shows a fourth stage (D') that includes simultaneously lowering the ship-side spreader (2), lifting the land-side spreader (3') and rotating 90° the anchoring assembly (41') of the horizontal transport carriage (4'), which is loaded with the container (10) of the ship, while displacing it until it is located under the land-side spreader (3').

Finally, the method of operation of FIG. 8 comprises a fifth stage (E') consisting of repeating the steps of the first stage (A'), but with other containers (10), as well as repeating successively the remaining stages, such as a sixth stage in which the container (10) is lowered with the land-side spreader (3'), etc.

Figure 9:
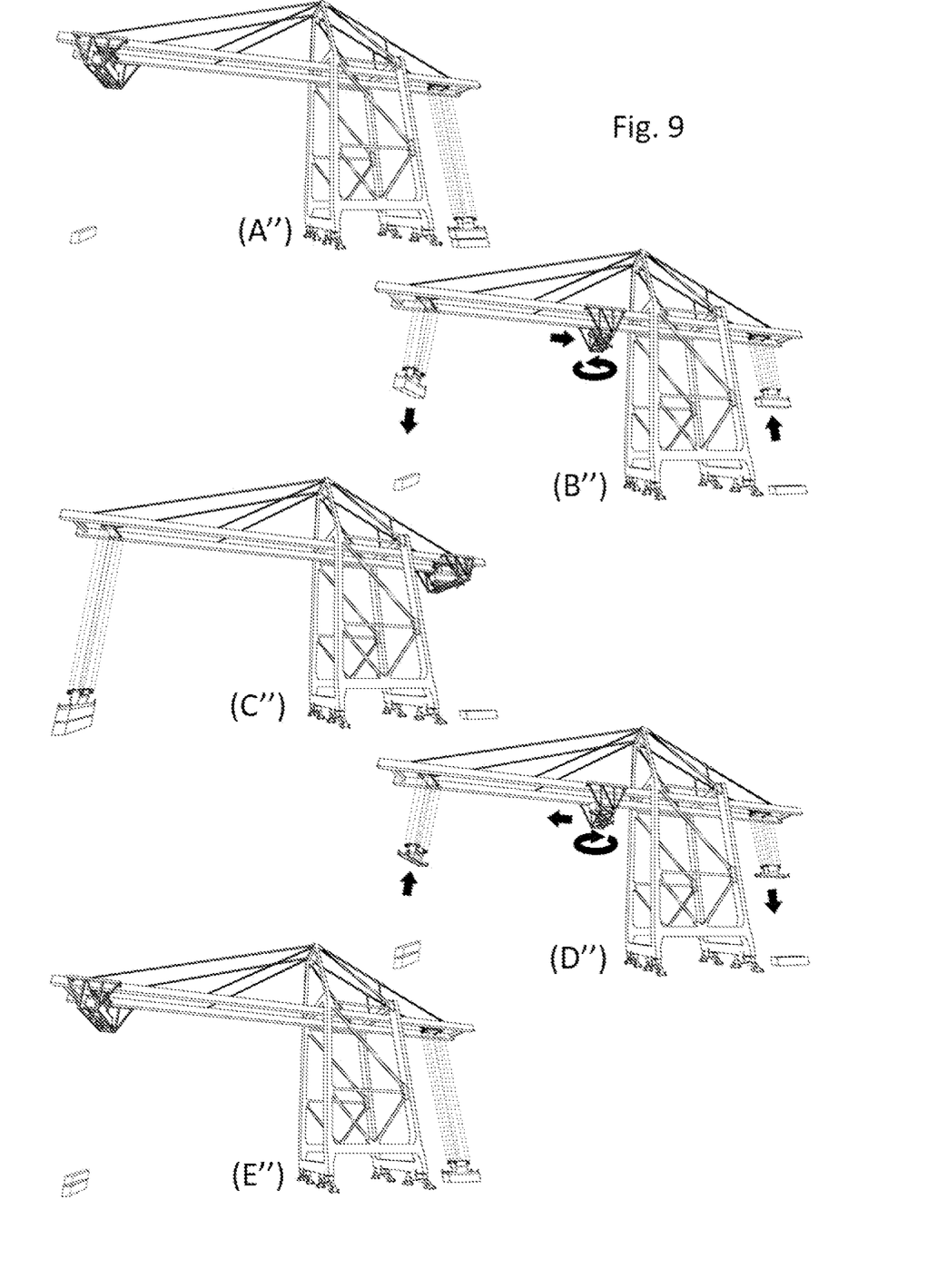
FIG. 9 is a representation of a possible succession of steps of a third method of operation of the present invention.

FIG. 9 shows an example of the method for loading containers from land to the ship with the crane shown in FIGS. 6 and 7. In this example, the method comprises a first step (A") that includes simultaneously anchoring the land-side spreader (3') to one of the containers (10) that are on the ground, undocking the container already transported by the horizontal transport carriage (4') of the anchoring assembly (41') thereof and anchoring the ship-side spreader (2) to said latter container (10).

Next, the method of operation of FIG. 9 comprises a second step (B") which includes simultaneously lifting the ground container (10) with the land-side spreader (3') while the horizontal transport carriage (4') is moved closer to it until it is placed under said container (10), while the other container (10) is lowered with the ship-side spreader (2). As can be seen, the position of the container 10 on the ship-side is perpendicular to the horizontal beam 1, while the position of the container 10 on the land-side is parallel to the horizontal beam 1.

Next, the method of operation of FIG. 9 comprises a third step (C") that simultaneously includes anchoring the horizontal transport carriage (4') to said ground container (10) and undocking from it the land-side spreader (3'), while at the same time undocking the ship-side spreader (2) from the lowered container.

Subsequently, the method of FIG. 9 shows a fourth stage (D") that includes simultaneously lowering the land-side spreader (3'), lifting the ship-side spreader (2) and rotating 90° the anchoring assembly (41') of the horizontal transport carriage (4'), which is loaded with the ground container (10), while displacing it until it is located below the ship-side spreader (2).

Finally, the method of operation of FIG. 9 comprises a fifth stage (E") consisting of repeating the steps of the first stage (A"), but with other containers (10), as well as repeating successively the rest of the stages, such as a sixth stage in which the container (10) is lowered with the ship-side spreader (2), etc.

Figure 10:
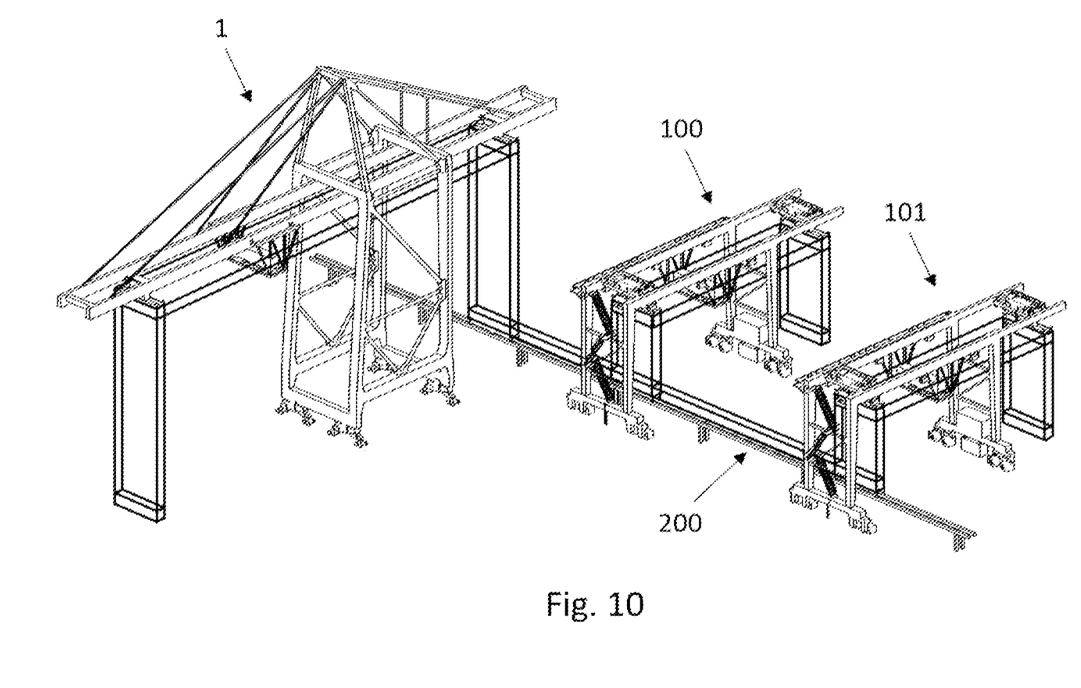
FIG. 10 is a perspective view of a third example of embodiment of the gantry crane for containers.

FIG. 10 shows a loading and unloading system comprising:
- a main gantry crane (1) and one or more secondary gantry cranes (100, 101), parallel to each other and each with their respective horizontal transport carriages and their respective spreaders, and
- at least one rail (200), perpendicular to the beams of the gantry cranes (1, 100, 101), which runs under one of its spreaders, and which has at least one horizontal transport carriage (in this embodiment located on rails adjacent to the ground, but it could be on an elevated beam) to receive a container and preferably move it autonomously between the gantry cranes (1, 100, 101).

The invention claimed is:

1. Gantry crane for containers having an elevated horizontal beam, comprising:
   one or more ship-side spreaders arranged to lift one or more containers and supported on a first section of said horizontal beam,
   one or more land-side spreaders arranged to lower one or more containers and supported on a second section of said horizontal beam, and
   a horizontal transport carriage mounted displaceably along the beam so as to be capable of being positioned under the containers lifted by the ship-side spreaders, and arranged to support said containers and displace them to a position under the land-side spreaders, said horizontal transport carriage comprising one or more anchoring assemblies for anchoring the containers in a dissociable way,
   wherein each anchoring assembly comprises a rotation mechanism configured suitable for rotating the anchoring assembly 90° about its vertical axis of symmetry.

2. A gantry crane for containers according to claim 1, wherein the land-side spreaders are arranged to anchor the containers in a position parallel to the horizontal beam.

3. A gantry crane for containers according to claim 1, wherein the land-side spreaders comprise a rotating mechanism for rotation about their vertical axis of symmetry, such that it is capable of anchoring the containers both in a position parallel to the horizontal beam and in a position perpendicular to it.

4. A gantry crane for containers according to claim 1, wherein it comprises at least one support carriage, arranged to move along the first section of the horizontal beam and to support at least one of the ship-side spreaders.

5. A gantry crane for containers according to claim 4, wherein it comprises at least one second support carriage, arranged to move along the second section of the horizontal beam and to support at least one of the land-side spreaders.

6. A gantry crane for containers according to claim 5, wherein the horizontal beam comprises two sets of rails, wherein the support carriages of the spreaders comprise a set of wheels arranged to move along one of said two sets of rails, and wherein the horizontal transport carriage comprises another set of wheels arranged to move along the other one of said two sets of rails.

7. A gantry crane for containers according to claim 6, wherein the horizontal beam has a double configuration and one of said two sets of rails is located on the inner faces of the horizontal beam, wherein the set of wheels of the support carriages is arranged to move on said one of the two sets of rails, while the other one of said two sets of rails is located on the upper surface of the horizontal beam and the set of wheels of the horizontal transport carriage is arranged to move on the said other one of said two sets of rails.

8. A gantry crane for containers according to claim 1, wherein it comprises an actuating device arranged to simultaneously actuate and operatively link the vertical displacement of at least one ship-side spreader and a land-side spreader, so that the gravitational potential energy and/or kinetic energy available in the containers lowered with the land-side spreaders can be exploited by the actuating device to lift other containers with the ship-side spreaders.

9. A gantry crane for containers according to claim 8, wherein said actuating device comprises a cable system with at least one cable that operatively links said spreaders with each other, said cable system being configures to be actuated by a transmission system.

10. A gantry crane for containers according to claim 8, wherein said actuating device comprises independent cable systems for each spreader, as well as a transmission system arranged to be connected in a dissociable way to said cable systems and operatively link them.

11. A gantry crane for containers according to claim 1, wherein it comprises one or more parallel beams under said horizontal beam, at different working heights, with their corresponding horizontal transport carriages.

12. A gantry crane for containers according to claim 1, wherein it comprises one or more additional horizontal beams arranged in a series configuration to said horizontal beam, which comprise respective horizontal transport carriages or respective spreaders, which comprise container anchoring means, either above or under them, and are configured to receive the containers and move them along said additional horizontal beams.

13. A gantry crane for containers according to claim 1, wherein it comprises a regenerative brake for braking the ascent and/or descent of the spreaders.

14. A gantry crane for containers as claimed in claim 1, wherein the ship-side spreaders, the land-side spreaders and the horizontal transport carriage comprise speed sensors, position sensors with respect to the containers and coupling sensors of the anchoring means and the anchoring assemblies.

15. A gantry crane for containers according to claim 1, wherein the horizontal transport carriage comprises a platform for access by an operator.

16. A method for unloading containers from a ship to land by means of a gantry crane for containers as claimed in claim 1, wherein it comprises:
   a first step (A') simultaneously including:
      anchoring one or more containers of the ship to the ship-side spreaders,
      undocking containers previously loaded to the horizontal transport carriage from the anchoring assemblies thereof and anchoring them to the land-side spreaders, these containers being previously loaded in a position parallel to the horizontal beam,
   a second step (B') which includes simultaneously lifting the containers of the ship with the ship-side spreaders and moving the horizontal transport carriage closer to the ship-side spreaders while their anchoring assemblies are rotated until they are placed under said containers in a position perpendicular to the horizontal beam, and simultaneously lowering with the land-side spreaders the previously loaded containers,
   a third step (C') which includes simultaneously anchoring the containers of the ship to the horizontal transport carriage by means of the anchoring assemblies and undocking the ship-side spreaders of said containers, while undocking the land-side spreaders of the previously loaded containers,
   a fourth step (D') including simultaneously lifting the land-side spreaders and rotating the anchoring assemblies 90° about their vertical axes of symmetry while moving the horizontal transport carriage loaded with the containers of the ship to place them under the land-side spreaders in a position parallel to the horizontal beam, while lowering the ship-side spreaders,
   a fifth stage (E') that includes simultaneously undocking the containers from the ship with respect to the horizontal transport carriage and anchoring them to the land-side spreaders, while anchoring other containers of the ship to the ship-side spreaders,
   a sixth stage including lowering the containers of the ship with the land-side spreaders, lifting the other containers with the ship-side spreaders, and moving the horizontal transport carriage closer to the ship-side spreaders while rotating the anchor assemblies until they are located under the other containers.

* * * * *